United States Patent
Washington et al.

(10) Patent No.: US 11,497,103 B1
(45) Date of Patent: Nov. 8, 2022

(54) POSTURE DETECTION FOR INTELLIGENT LIGHTING ACCESSORY CONTROL

(71) Applicant: Microsoft Technology Licensing, LLC, Redmond, WA (US)

(72) Inventors: David E. Washington, Saint Paul, MN (US); Danielle Tene, Seattle, WA (US); Whitney J. Giaimo, Issaquah, WA (US); Alexander Bennett, Seattle, WA (US); Ann McInroy, Seattle, WA (US); Natalia Urbanowicz, New York City, NY (US); Simon Dearsley, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/319,617

(22) Filed: May 13, 2021

(51) Int. Cl.
  *H05B 47/175* (2020.01)
  *H04N 5/232* (2006.01)
  *H04N 5/225* (2006.01)
  *F21S 6/00* (2006.01)

(52) U.S. Cl.
  CPC ........ *H05B 47/175* (2020.01); *H04N 5/2256* (2013.01); *H04N 5/2257* (2013.01); *H04N 5/23216* (2013.01); *F21S 6/003* (2013.01)

(58) Field of Classification Search
  CPC .. H05B 47/175; H04N 5/2256; H04N 5/2257; H04N 5/23216
  See application file for complete search history.

(56) References Cited

U.S. PATENT DOCUMENTS

| | | | |
|---|---|---|---|
| 9,635,740 B2 | 4/2017 | Sun et al. | |
| 10,043,125 B2 | 8/2018 | Park | |
| 10,208,977 B2 | 2/2019 | Bhide | |
| 10,521,185 B1 | 12/2019 | Kim et al. | |
| 2008/0002049 A1* | 1/2008 | Saito | G06F 1/1677 348/370 |
| 2016/0127641 A1* | 5/2016 | Gove | H04N 5/23218 348/143 |
| 2016/0212376 A1* | 7/2016 | Tang | G06F 3/16 |
| 2018/0228003 A1* | 8/2018 | O'Driscoll | H05B 47/125 |
| 2018/0324924 A1 | 11/2018 | Van De Sluis et al. | |

(Continued)

FOREIGN PATENT DOCUMENTS

| EP | 2717580 A1 | 4/2014 |
|---|---|---|
| EP | 2540118 B1 | 5/2017 |

OTHER PUBLICATIONS

"1080P Webcam with Ring Light, Privacy Cover and Dual Microphone, Advanced Auto-Focus, Adjustable Brightness, 2021 NexiGo Streaming Web Camera for Zoom Skype Facetime, PC Mac Laptop Desktop", Retrieved from: https://www.amazon.com/Cover-Microphone-Auto-Focus-Adjustable-NexiGo/dp/B08FT7Y53Y, Aug. 13, 2020, 15 Pages.

(Continued)

*Primary Examiner* — Amy R Hsu
(74) *Attorney, Agent, or Firm* — Holzer Patel Drennan (57) ABSTRACT

A method for intelligently controlling a lighting accessory coupled to a host device includes determining a posture of the lighting accessory, the posture being one of multiple user-selectable physical configurations; and selectively configuring a setting of an application executing on the host device based at least in part on the determined posture.

19 Claims, 6 Drawing Sheets

(56) References Cited

U.S. PATENT DOCUMENTS

2020/0217495 A1* 7/2020 Shum .................. F21V 7/0016
2022/0070342 A1* 3/2022 Shen .................. F21V 23/045

OTHER PUBLICATIONS

"Mount Up, Light Up, What'S Up", Retrieved from: https://web.archive.org/web/20201125185134/https:/www.razer.com/streaming-cameras/razer-kiyo/RZ19-02320100-R3U1, Retrieved Date: Nov. 25, 2020, 11 Pages.

Gerald, "Geek Review: Razer Kiyo Webcam", Retrieved from: http://web.archive.org/web/20200811184742/https:/geekculture.co/geek-review-razer-kiyo-webcam/, Aug. 11, 2020, 12 Pages.

"DIGITEK 18" Professional big LED Ring Light with 2 color modes Dimmable Lighting | For YouTube | Photo-shoot | Video shoot | Live Stream | Makeup & Vlogging | Compatible with iPhone/Android Phones & Cameras. (DRL 018), Retrieved from: https://www.amazon.in/Digitek-DRL-18-Professional-Light-White/dp/B07MD4YBR4/ref=asc_df_B07MD4YBR4/?tag=googleshopdes-21&linkCode=df0&hvadid=397006055254&hvpos=&hvnetw=g&hvrand=9253706030534874835&hvpone=&hvptwo=&hvqmt=&hvdev=c&hvdvcmdl=&hvlocint=&hvlocphy=9061668&hvtargid=pla-835752569446&psc=1&ext_vrnc=hi, Dec. 23, 2018, 18 Pages.

"HD Webcam 2K Streaming USB Webcam with Ring Light Adjustable Brightness Autofocus, Webcam with Microphone for Desktop", Retrieved from https://www.amazon.com/dp/B08LDBS8DJ/ref=sspa_dk_detail_5?psc=1&pd_rd_i=B08LDBS8DJ&pd_rd_w=tllyb&pf_rd_p=7d37a48b-2b1a-4373-8c1a-bdcc5da66be9&pd_rd_wg=SEKWj&pf_rd_r=FZ8Z1GKR52QM8939GYWN&pd_rd_r=e49bc0cd-4a06-46e4-91d6-fe1272564dac&spLa=ZW5jcnlwdGVkUXVhbGlmaWVyPUExVjBXU0MwSEY5OE44JmVuY3J5cHRIZElkPUEwODk4ODczMIZPQktMTjM1R0ZJMiZlbmNyeXB0ZWRBZElkPUEwOTU4MTA3M0pTSk02VkNQS1ZUQyZ3aWRnZXROYW1lPXNwX2RldGFpbCZhY3Rpb249Y2xpY2tSZWRpcmVjdCZkb05vdExvZ0NsaWNrPXRydWU, Oct. 19, 2020, 9 Pages.

"International Search Report & Written Opinion issued in PCT Application No. PCT/US22/024159", dated Jul. 18, 2022, 11 Pages.

* cited by examiner

Passive Use – – – – – → Active Use

Application Actions in response to Posture Change

- Privacy mode "off" (camera on, begin video broadcast)

- Reconfigure light output settings

404

Active Use – – – – – → Passive Use

- Privacy mode "on" (camera off, halt video broadcast) unless user-selectable setting indicates override intention

- Reconfigure light output settings

POSTURE DETECTION FOR INTELLIGENT LIGHTING ACCESSORY CONTROL

BACKGROUND

A user may have different lighting preferences when performing different tasks in a home office or work office. For example, a user may prefer direct lighting (e.g., to illuminate the user's face) during video conferencing and more traditional lighting (e.g., a task lamp) to perform document review tasks. Brightness and hue preferences may also vary based on the activit(ies) the user is performing or on other factors, such as the time of day or weather.

SUMMARY

According to one implementation, a method for intelligently controlling a lighting accessory coupled to a host device includes determining a posture of the lighting accessory, where the posture is one of multiple user-selectable physical configurations. The method further includes selectively configuring a setting of an application executing on the host device based at least in part on the determined posture.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other implementations are also described and recited herein.

DETAILED DESCRIPTION

Existing lighting solutions typically lack multi-purpose features to suit the needs of a modern user in a home or work office environment. While traditional lighting solutions are often still desired (e.g., table lamps for document review), modern users may also seek out lighting solutions designed to provide optimal self-illumination during video conference calls. A user's lighting preferences (e.g., brightness, hue) may vary based on the task(s) that the user is performing as well as upon other factors such as ambient light in a room, time of day, weather, etc. Manually adjusting multiple different light sources can be burdensome to a user.

Figure 1:
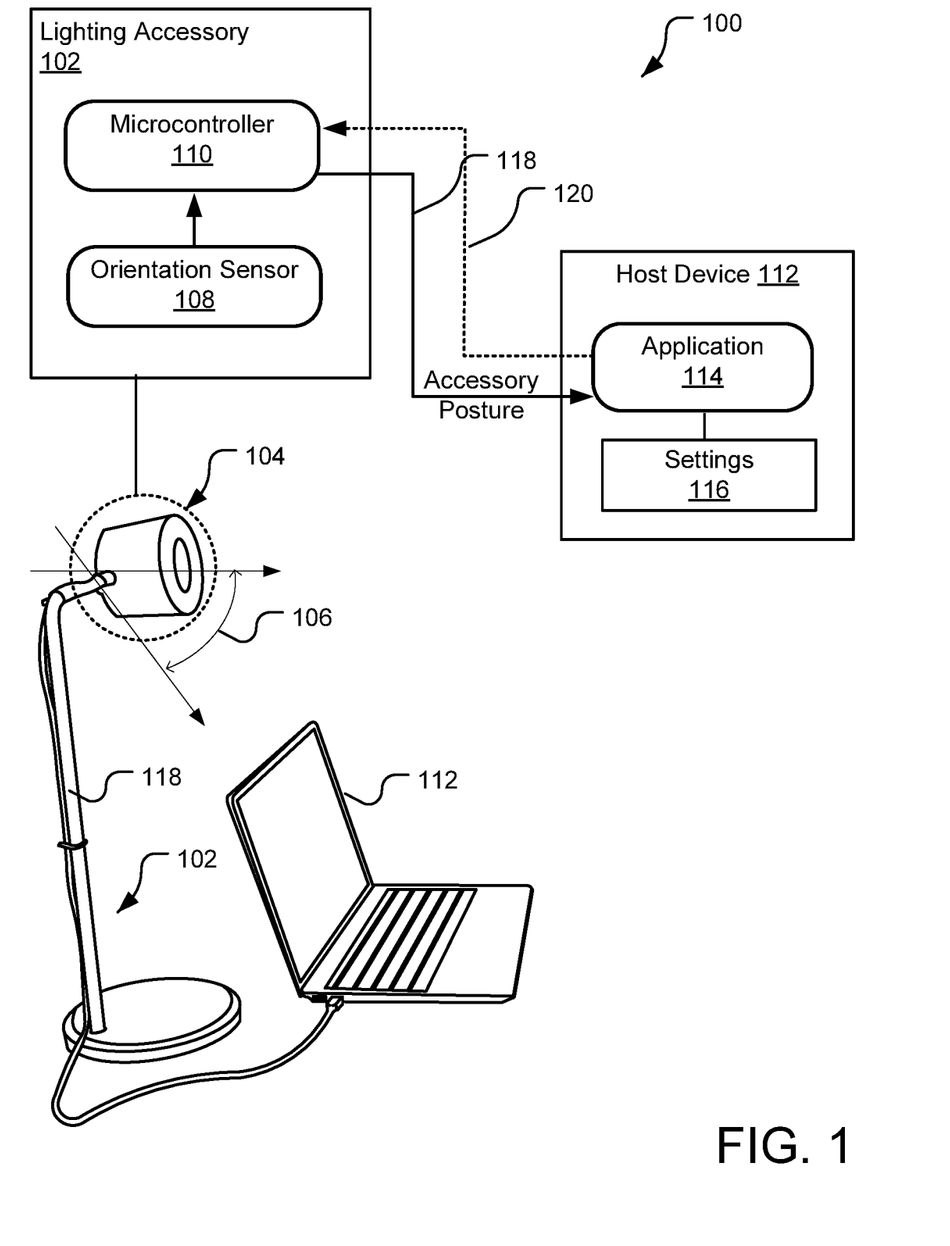
FIG. 1 illustrates an example computing system with a lighting accessory that is controllable by a host device to dynamically and autonomously adapt light output settings to compliment various different office-related tasks that may be performed by a user.

FIG. 1 illustrates an example computing system 100 with a lighting accessory 102 that is controllable by a host device 112 to dynamically and autonomously adapt light output settings to compliment various different office-related tasks that may be performed by a user. The lighting accessory 102 includes a stand 118 that supports a light source 104 that can be pivoted about an axis 106 to direct light output at a selectable angle relative to the stand 118. For example, the light source 104 may be rotated to have a light output substantially perpendicular to an underlying table to illuminate a document on a table or to have a light output substantially parallel to the table to instead illuminate a user's face, such as during a video call. The lighting accessory 102 is shown to be a table-top desk lamp but may, in other implementations, assume a variety of other forms such as that of a floor lamp, wall-mounted lighting source, lamp that is mounted on a computer monitor or on a temporary mount of some type, etc.

Features of the lighting accessory 102 may vary in different implementations; however, the lighting accessory 102 includes at least a sensor 108 and a microcontroller 110. The microcontroller 110 conveys outputs of the sensor 108 to a host device 112 and dynamically and adaptively controls the lighting accessory 102 based on control signals received from an application 114 executing on the host device 112. The sensor 108 is configured to detect a physical configuration (e.g., position, posture, orientation) of the lighting accessory 102 relative to its real-world surroundings. For example, the sensor 108 may include one or more orientation or tilt sensing instruments such as an accelerometer or a gyroscope and/or one or more "switch" style sensors such as a hall effect sensor, read switch, or toggle switch. The lighting accessory 102 is communicatively coupled to the host device 112 by either a wired or wireless connection such that the microcontroller 110 of the lighting accessory 102 can convey the measurement(s) of the sensor 108 to the host device 112. Measurements output by the sensor 108 are referred to herein as measurements of "posture," meaning that each measurement of the sensor 108 is representative of a corresponding range or interpretation of sensor values that map to a given physical configuration of the lighting accessory 102. In the example of FIG. 1, each different posture of the light source 104 corresponds to a different primary axis of transmission for light emitted by the light source 104.

The host device 112 is a processing device that is, at least one implementation, communicatively coupled to an external network (e.g., the internet). The host device 112 is shown to be a laptop computer but may assume a range of forms including without limitation that of a desktop computer, tablet, mobile phone, set-top box, gaming console, etc. In one implementation, the host device 112 executes an application 114 that is adapted to receive, as an input, an accessory posture 118 from the microcontroller 110 of the lighting accessory 102, where the accessory posture 118 indicates a current posture of the light source 104. For example, the application 114 may receive the accessory posture 118 at regular intervals, upon request by the application 114, or responsive to trigger event(s) that are performed by a user, such as responsive to a user's provisioning of an input to the application 114 or to the lighting accessory 102.

The application 114 may, in different implementations, serve a variety of different functions enabled configurable settings 116 that, among other functions, serve to control aspects of the lighting accessory 102 such as power and light output (brightness, hue). In another implementation, the lighting accessory 102 includes a camera (not shown) and the settings 116 of the application 114 control one or more video or image capture settings, such as whether the camera is on or off (e.g., a privacy mode), resolution, field-of-view, etc.

Responsive to detecting a change in the accessory posture 118 from the microcontroller 110 of the lighting accessory 102, the application 114 adaptively reconfigures one or more of the settings 116 to alter a functionality the lighting accessory 102 and/or the application 114. For example, reconfiguration of one or more of the settings 116 may cause the host device 112 to transmit control signal(s) 120 to the lighting accessory 102 that are effective to alter functionality of the lighting accessory 102 in some way, such as to adjust brightness or hue of light output or to alter a video capture control setting on a camera (e.g., if the lighting accessory 102 includes a camera). Alternatively, reconfiguration of the settings 116 may trigger functions of the application 114 that do not necessarily affect the functionality of the lighting accessory 102. For example, a detected change in the accessory posture 118 may cause the application to initialize or cease transmission of live-captured video, to alter a mode of the application 114, or to trigger other various control or processing actions of the application 114.

The integration of the lighting accessory 102 with software (e.g., the application 114) in the host device 112, either alone or in conjunction with integration of camera (video capture) controls, streamlines the user experience by allowing the user to initialize a new activity with fewer manual actions. For example, the user may rotate the light source 104 to a select position to cause the application 114 to automatically initiate several different tasks—e.g., adjusting brightness and/or color of light emitted by the rotatable light source and/or initializing certain features or mode(s) of the application 114. In another implementation, the user may cause the application 114 to start capturing and streaming video (e.g., from a camera in the lighting accessory 102 or in the host device 112) merely by repositioning the light source 104 and without providing other inputs to the application 114.

In addition to reducing the total number of manual actions a user performs to accomplish certain office tasks, the herein disclosed intelligent lighting control features may also eliminate the need for the user to have multiple different light sources dedicated to different office functions, consolidating the functionality previously served by multiple different lighting devices into a single device. Additionally, auto-implementing adjustments to brightness or hue (color) based on set conditions (e.g., user preferences, ambient light) can create help to create a more pleasant office ambiance for the user without burdening the user to make or implement decisions about such adjustments.

Figure 2:
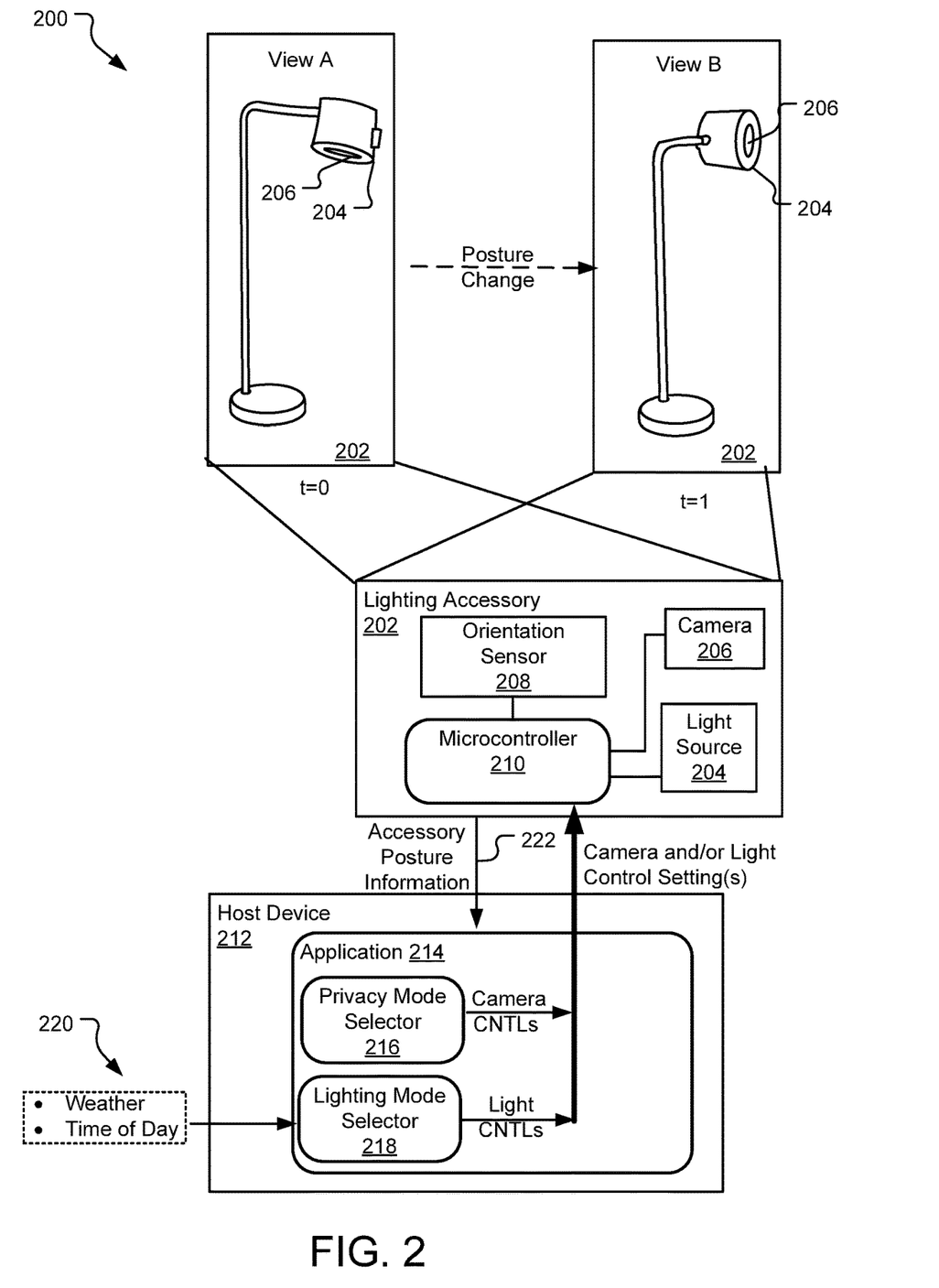
FIG. 2 illustrates another example computing system that automates various controls of and application and/or of a lighting accessory based at least in part on detected changes in the posture of the lighting accessory.

FIG. 2 illustrates another example computing system 200 that automates various controls of an application 214 and/or of a lighting accessory 202 based on detected changes in the posture of the lighting accessory 202. By example and without limitation, View A of FIG. 2 illustrates the lighting accessory 202 with the light source 204 positioned according to a first posture (light output directed toward a table) at a first time (t=0) to support a first use scenario referred to herein as "passive use mode." Passive use mode is, for example, a mode in which the light source 204 acts as a traditional table lamp to support tasks such as document review. In contrast, View B illustrates the lighting accessory 202 with the light source 204 positioned according to a second posture (light directed generally toward a user sitting at or next to a table supporting the light source) at a subsequent time (t=1). In this second posture, the light source 204 supports a second use scenario referred to herein as "active use mode." Active use mode is, for example, a mode in which the light source 204 illuminates a user for a video conference. When positioned to support the passive use mode, as in View A, the light source 204 emits at least some light along a transmission axis substantially perpendicular to an underlying surface (e.g., a table). When positioned to support active use mode (View B) the light source emits at least some light along a transmission axis substantially parallel to the underlying surface. As used herein, "substantially" encompasses a range of angles that are within +/−10 degrees of the direction indicated.

In different implementations, the first and second postures may correspond to orientations different than that shown in FIG. 2. For example, the first posture may correspond to an angle of the light source 204 that is within a first defined angular range (e.g., an angle of 45 degrees or less relative to an underlying surface) while the second posture may correspond to angle of the light source 204 that is within a second defined angular range (e.g., an angle of greater than 45 degrees relative to an underlying surface). In some implementations, the measurements of the sensor 208 may be interpreted as corresponding to any one of three or more discrete, defined postural configurations supporting modes of use in addition to in lieu of the "active use mode" and "passive use mode" described above.

The angular position (posture) of the light source 204 is measured by an sensor 208. A microcontroller 210 receives measurement values output by the sensor 208 and, in response, transmits accessory posture information 222 to the host device 212. The accessory posture information 222 may, for example, include the measurement data output by the sensor 208 or other information that is retrieved (e.g., from a look-up table) or otherwise generated based on the measurement data of the sensor 208. Responsive to receipt of the accessory posture information 222, the host device 212 provides an application 214 with inputs indicative of detected changes in the posture of the light source 204. The application 214, in turn, alters one or more camera or light control settings of the lighting accessory.

By example and without limitation, the application 214 is shown to include two submodules—a privacy mode selector 216 and a lighting mode selector 218. In one implementation, the privacy mode selector 216 enables a "privacy mode" when the accessory posture information 222 indicates that the light source has been rotated from the second posture (View B) to the first posture (View A). For example, the privacy mode selector 216 may enable privacy mode by placing an API call that causes the host device 212 to transmit a control signal that toggles a power of the camera 206 from "on" to "off." Alternatively or additionally, the privacy mode selector 216 may enable the privacy mode by blocking the application 214 from exporting video to an external network, thus optionally allowing the camera 206 to continue collecting video, such as in a "preview" display mode.

The privacy mode selector 216 may be configured to disable privacy mode when the accessory posture information 222 is indicative of a change in the posture of the light source 204 from the first posture (View A) to the second posture (View B). For example, the privacy mode selector 216 may disable the privacy mode by toggling power of the camera 206 from "off" to "on" or by changing a setting to permit the application 214 to resume exportation of a video stream to an external network. Automatically toggling privacy settings of the application 214 (e.g., toggling the camera on/off) based on the accessory posture information 222 provides the user with an easy way to ensure the camera is not inadvertently turned "on" to broadcast video when the user wishes for the camera to remain off. For instance, it may be much easier for a user to visually observe the posture of the lighting accessory 202 and confirm the camera 206 is "off" than for the user to verify the same by opening or otherwise locating one or more camera settings within a user interface of the application 214. Reducing the complexity of "checking" the current privacy mode settings in this way may therefore help to ensure that the user does not inadvertently broadcast video data at times when the user does not desire to do so.

In contrast to the privacy mode selector 216 that controls camera settings and or video exportation, the lighting mode selector 218 controls light settings (e.g., brightness and/or hue) of the light based on the accessory posture information 222 that is transmitted from the lighting accessory 202 to the host device 212. When, for example, the accessory posture change information indicates that the light source 204 is oriented in the first posture (e.g., as in View A), the lighting mode selector 218 may adjust lighting settings of the lighting accessory 202 to selectively reconfigure a brightness and/or hue of the light source 204 according to a first group of preset values. For example, such settings may configure the light source 204 according to a "yellow" (easy-on-the-eyes) hue and medium brightness for document review.

When, alternatively, the accessory posture change information indicates that the light source 204 has been rotated from the first posture (View A) to the second posture (View B), the lighting mode selector 218 may adjust the settings of the lighting accessory 202 to selectively reconfigure a brightness and/or hue of the light source 204 according to a different group of preset values, such as values that are predefined or user-selected for the purpose of providing optimal video conferencing lighting. For example, such settings may configure the light source 204 according to a more "blue" or softer-feel hue and/or brightness that flatters or compliments the user's appearance in video captured by computing system 200.

In the above example, the preset values of brightness and/or hue corresponding to each different posture of the light source 204 of the light may, in various implementations, be default values or user-selected values (e.g., values that depend upon user preset user preferences). In some implementations, the lighting mode selector 218 controls the light source 204 based on other inputs in addition to or in lieu of accessory posture change information. For example, the host device 212 and/or lighting accessory 202 may include an ambient light sensor (not shown) that detects ambient light levels within a room. These ambient light measurements may, in turn, be used by the lighting mode selector 218 to select a brightness and/or hue setting for the currently-supported use mode (active or passive), as determined by the accessory posture information 222. In the same or another implementation, the lighting mode selector 218 utilizes other external inputs 220 to selectively configure brightness and/or hue settings of the light source 204. For example, the external inputs 220 may include weather data and/or time-of-day information (e.g., both potentially indicative of ambient light levels) that is usable to dynamically select hue and/or brightness settings of the light source 204 in association with the currently-supported use mode, as determined by the accessory posture information 222. For example, the lighting mode selector 218 may query a database with the external inputs 220 (e.g., alone or in association with the accessory posture information) to retrieve stored recommended values for brightness and hue of the light source 204.

Figure 3:
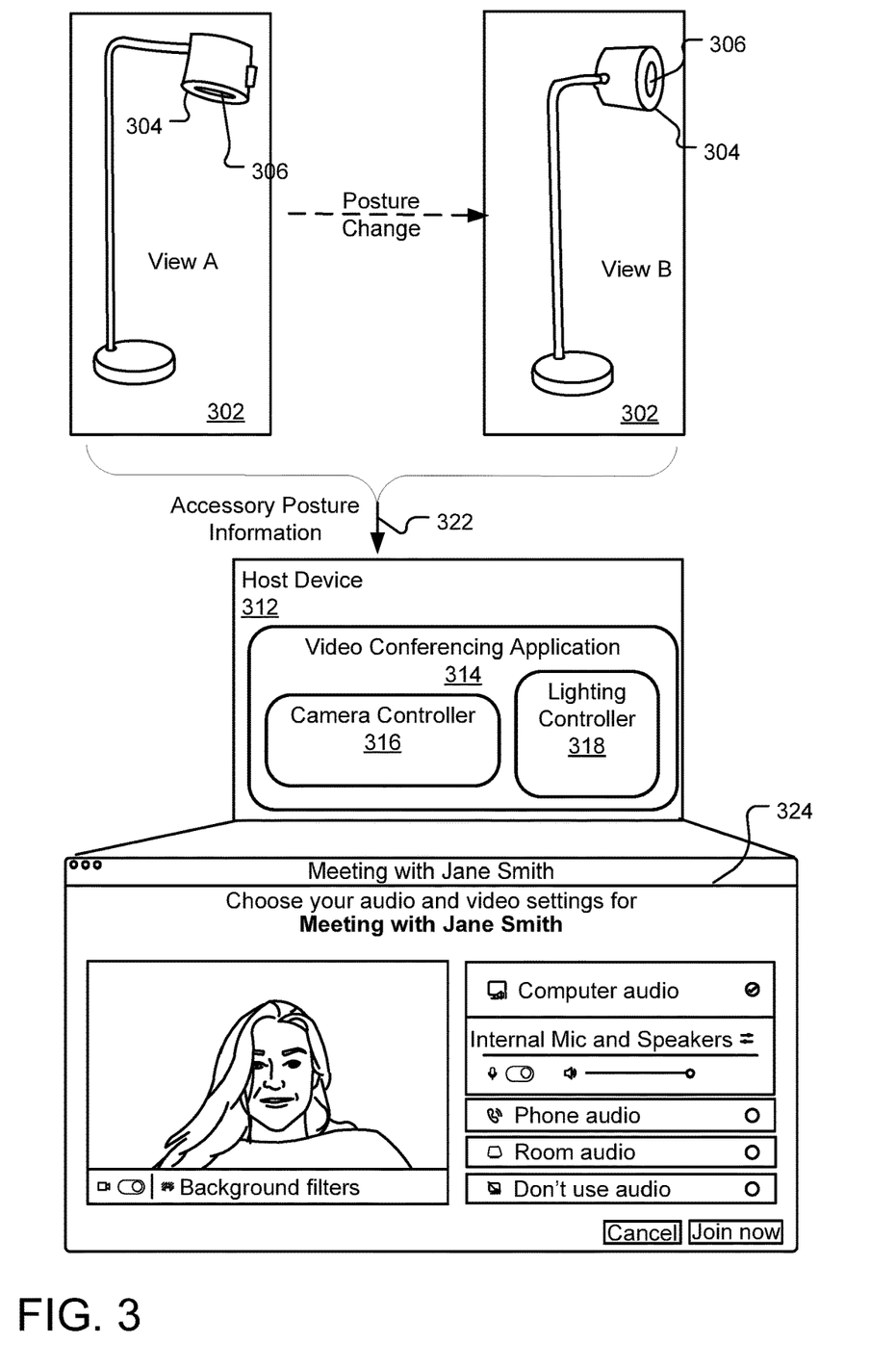
FIG. 3 illustrates still another example computing system that automates various controls of an application and/or of a lighting accessory based at least in part on detected changes in the posture of the lighting accessory.

FIG. 3 illustrates still another example computing system 300 that automates various controls of an application 314 and/or of a lighting accessory 302 based on detected changes in the posture of the lighting accessory 302. The lighting accessory 302 includes both a light source 304 and a camera 306 positioned such that a line-of-sight of the camera 306 corresponds to a primary transmission axis of the light that is output by the light source 304. In one implementation, the light source 304 is annular in shape (e.g., a ring of LEDs) and the camera 306 is positioned at a center of the annular shape.

Similar to FIG. 2, View A illustrates the lighting accessory 302 operating in a passive use mode, with a light source 304 directing light output downward, generally perpendicular to a table or underlying surface (not shown). View B illustrates the lighting accessory 302 at a subsequent time after a user has manually rotated a light source 304 upward by 90 degrees such that emitted light is directed along an axis substantially parallel to the underlying table. Other aspects of the lighting accessory 302 not explicitly described with respect to FIG. 2 may be assumed to be the same or similar to other figures disclosed herein.

When a user manually rotates the light source 304 from the position shown in View A to the position shown in View B, the lighting accessory 302 transmits accessory posture information 322 to a host device 312. The host device 312, in turn, provides the accessory posture information to a locally-executing application. This locally-executing application is, in FIG. 3 shown—by example and without limitation—to be a conferencing application 314 that dynamically reconfigures various application settings that control video capture settings the camera 306 and/or the light source 304 based on the received accessory posture information. As used herein, the term video capture settings refers to settings that control or alter video capture such as power mode changes of a camera, changes in camera field-of-view, focus, resolution etc.

The video conferencing application 314 includes a user interface (UI) 324 with conferencing settings that are dynamically adjusted responsive to detected changes in the accessory posture information 322. Specifically, the video conferencing application includes a camera controller 316 and a lighting controller 318 configured to execute different control actions responsive to detected changes in the posture of the light source 304. Exemplary alterations in conferencing settings of the video conferencing application 314 are discussed in greater detail with respect to FIG. 4.

Figure 4:
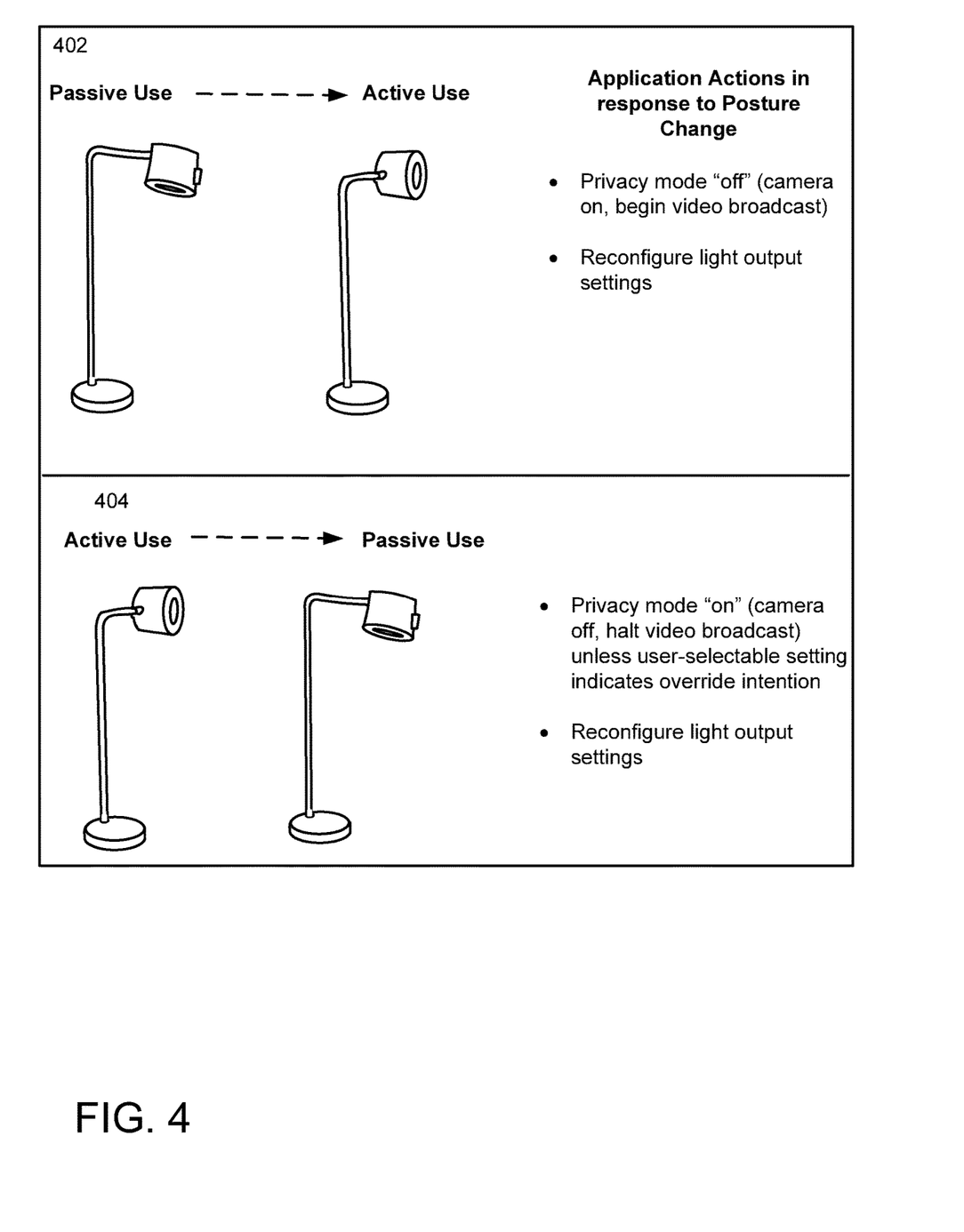
FIG. 4 illustrates a table illustrating exemplary settings of a video conferencing application that are dynamically adjusted responsive to changes in accessory posture information received from a lighting accessory.

FIG. 4 illustrates a table 400 illustrating exemplary settings of a video conferencing application that are dynamically adjusted responsive to changes in accessory posture information received from a lighting accessory, such as the lighting accessory 302 of FIG. 3. The lighting accessory is manually reconfigurable by a user to assume different physical configurations (postures) that each correspond to different modes and settings of the video conferencing application. In FIG. 4, it is assumed that the lighting accessory includes at least an sensor and a microcontroller configured to transmit detected postural changes of the lighting accessory to a host device. The lighting accessory further includes a light source and a camera proximal to the light source, as described with respect to FIGS. 2 and 3.

The table 400 in FIG. 4 illustrates actions that may be performed by the video conferencing application responsive to transitions back and forth between a passive use mode and an active use mode of the lighting accessory. In the passive use mode, the light source of the lighting accessory is directed downward at an underlying surface. In active use mode, the light source positioned to transmit light in a direction of a user (e.g., to transmit light parallel to the surface), such as to illuminate a user's face.

A top row 402 of the table 400 illustrates actions performed in an exemplary scenario in which the user rotates the light source from the passive use mode posture to the active use mode posture. When this postural change is detected by the lighting accessory and conveyed as an input to the video conferencing application executing on the host device, the video conferencing application 314 automatically turns on the camera in the lighting accessory without waiting to receive further input from a user. That is, the user may not need to supply any input through a user interface (UI) of the video conferencing application to switch the camera into an "on" power mode.

In one implementation where the video conferencing application is supporting an active video conferencing call at the time the light source posture is altered as shown (e.g., the user is initially on the call in an audio-only mode), the postural change illustrated in the row 402 causes the video conferencing application to disable a privacy mode and begin broadcasting a video stream captured by the camera. In another implementation where the video conferencing application is not supporting an active video conferencing call at the time the light source posture is altered as shown, the postural change illustrated in the row 402 causes the camera to turn "on" and project captured video to the host display in a preview mode without yet broadcasting the video to remote user devices. In this case, the user's subsequent initialization of a video conferencing call through the video conferencing application may serve to initialize the external broadcast of the video stream that is being locally projected to the host device display.

When the host device detects the above-described postural change in the lighting accessory (shown in row 402), the video conference application or another application executing on the host device may also take action(s) to selectively reconfigure settings of the lighting accessory. For example, the host device application may adjust brightness and/or color of the light emitted by the lighting accessory to values pre-selected in association with the "active use mode," such as values that provide a softer or more flattering illumination of a human subject than other lighting settings stored in association with the passive use mode or other use modes of the lighting accessory.

A lower column 404 of the table 400 illustrates actions performed in an exemplary scenario in which the user rotates the light source from the active use mode posture to the passive use mode posture. In one implementation, this postural change causes the application to enable the privacy mode setting and stop transmitting the video stream captured by the camera.

In some implementations, the video conferencing application includes one or more user interface (UI) controls that allow the user to override the "privacy mode off" operation that is otherwise executed by default when the lighting accessory is placed in the passive posture, as shown. For example, the UI may have a "video on/off" button or other selectable input option that, when selected, ensures that the camera stays on—without interrupting an ongoing video broadcast—when the camera posture changes from "active" to "passive." For example, this scenario may cause the video conferencing application to enter a "document capture" mode in which a physical document (e.g., on the user's table or desk) is imaged by the camera and shared in the video stream.

Although the camera power remains "on" (unchanged) when the video conferencing application transitions between the "user capture" video mode and the "document capture" video mode, the video conferencing application may selectively reconfigure other video capture settings responsive to this mode transition, such as focus, resolution, field-of-view (zoom), etc. In any video mode of operation (e.g., standard "user capture" or "document capture"), camera settings may be either static, preset values or dynamically-selected values, such as values selected based upon dynamically-performed calibrations, user-guided controls, or other system inputs such as ambient lighting, weather, and time of day.

In either of the above-described scenarios associated with the lower column 404 in the table 400 (e.g., privacy mode v. document capture mode), either the video conferencing application or another application of the host device may selectively reconfigure light output settings of the lighting accessory in association with the newly-selected mode of use. For example, the host device may selectively configure the light source according to a first set of light output settings when the video conferencing application is operating in the "privacy mode" (e.g., where the light is acting as a traditional table lamp) and selectively reconfigure the light source according a second set of light output settings when the video conferencing application is operating in the "document review mode" (e.g., where the light is illuminating a physical document, such as a printed article, book, table object, etc.) As in other implementations, lighting setting values within each mode of use may be statically define or dynamically selected.

Figure 5:
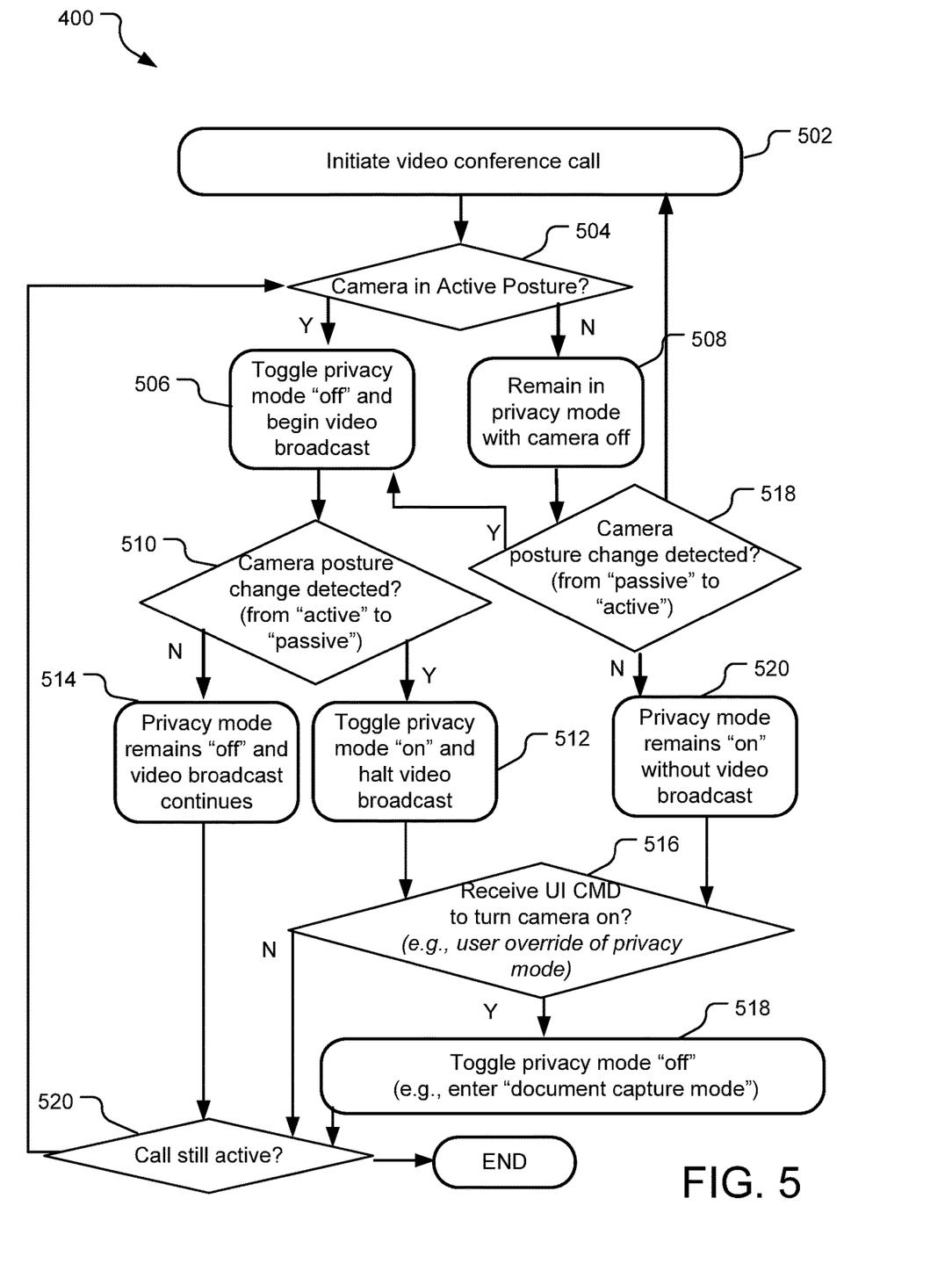
FIG. 5 illustrates example operations for dynamically controlling a camera from a video conferencing application responsive to detected changes in the posture of a lighting accessory.

FIG. 5 illustrates example operations 500 for dynamically controlling a camera from a video conferencing application responsive to detected changes in the posture of a lighting accessory. The lighting accessory is manually reconfigurable for use in different physical postures and includes an sensor that measures an orientation indicative of a direction of light output. The lighting accessory also includes a camera and a microcontroller that conveys information back to a host device that is indicative of the current posture of the lighting accessory. The light accessory posture is, in the following description, assumed to be the same as the camera posture. That is, the camera is assumed to be positioned within the lighting accessory such that light output of the lighting accessory is generally parallel to the camera's line-of-sight and object(s) within the field-of-view of the camera are illuminated by the light.

A call initiation operation 502 initiates a video conference call, such as in response to user-provided UI input to the video conferencing application. A determining operation 504 determines whether a camera on a lighting accessory is in an "active posture," such as in the manner shown and described with respect to FIG. 2-4.

If the camera is in the active posture at the time that the video conference call is initiated, a toggling operation 506 toggles a privacy mode setting to "off," which has the effect of initiating an external broadcast of a video stream captured by the camera. For example, the privacy mode setting may toggle the power on the camera and/or toggle one or more settings governing control of an external video broadcast channel.

With reference to operations following the toggling operation 506 on the left side of the FIG. 5 flowchart, a determining operation 510 next determines whether the camera posture has changed from the "active" posture to the "passive" posture (e.g., as shown and described with respect to FIGS. 2, 3, and 4). If the camera posture has changed to the "passive" posture, a toggling operation 512 toggles the privacy mode back to "on," which has the effect of halting the video broadcast (e.g., either by turning off the camera or by preventing transmission of the camera feed across an external broadcast communication channel). If the determination operation 510 determines that the camera posture has not changed (e.g., the camera is still in the "active" posture), a null operation 514 takes no action and privacy mode settings remain unchanged with video broadcast continuing.

With reference back up to the determining operation 504 and the right-hand side of the flowchart: when it is determined that the camera is not in the active posture (e.g., the camera is instead in the passive posture), a null operation 508 takes no action and privacy mode remains enabled with video broadcasting disabled. A determination operation 518 next determines whether the camera posture has changed from the passive posture to the active posture. If so, the toggling operation 506 toggles privacy mode to "off" and video broadcasting begins. If not, a null operation 520 takes no action and privacy mode remains "on" with external video broadcasting disabled.

Following both the toggling operation 512 and the null operation 520 above (e.g., the scenarios above where privacy mode remains enabled with the camera broadcast disabled), a determining operation 516 determines whether the video conferencing application has received a user interface (UI) command effective to override the privacy mode and turn the camera on. If so, a toggling operation 518 toggles the privacy mode to "off," which has the effect of starting the video broadcast (e.g., either by turning on the camera and/or by initializing transmission of the camera feed across an external broadcast communication channel). In this case, the camera is on but the camera is in the passive posture where it is directed downward toward an underlying surface rather than at the user. This configuration may, for example, be used to image a document sitting on the user's desktop surface and is also referred to herein as "document capture mode."

Figure 6:
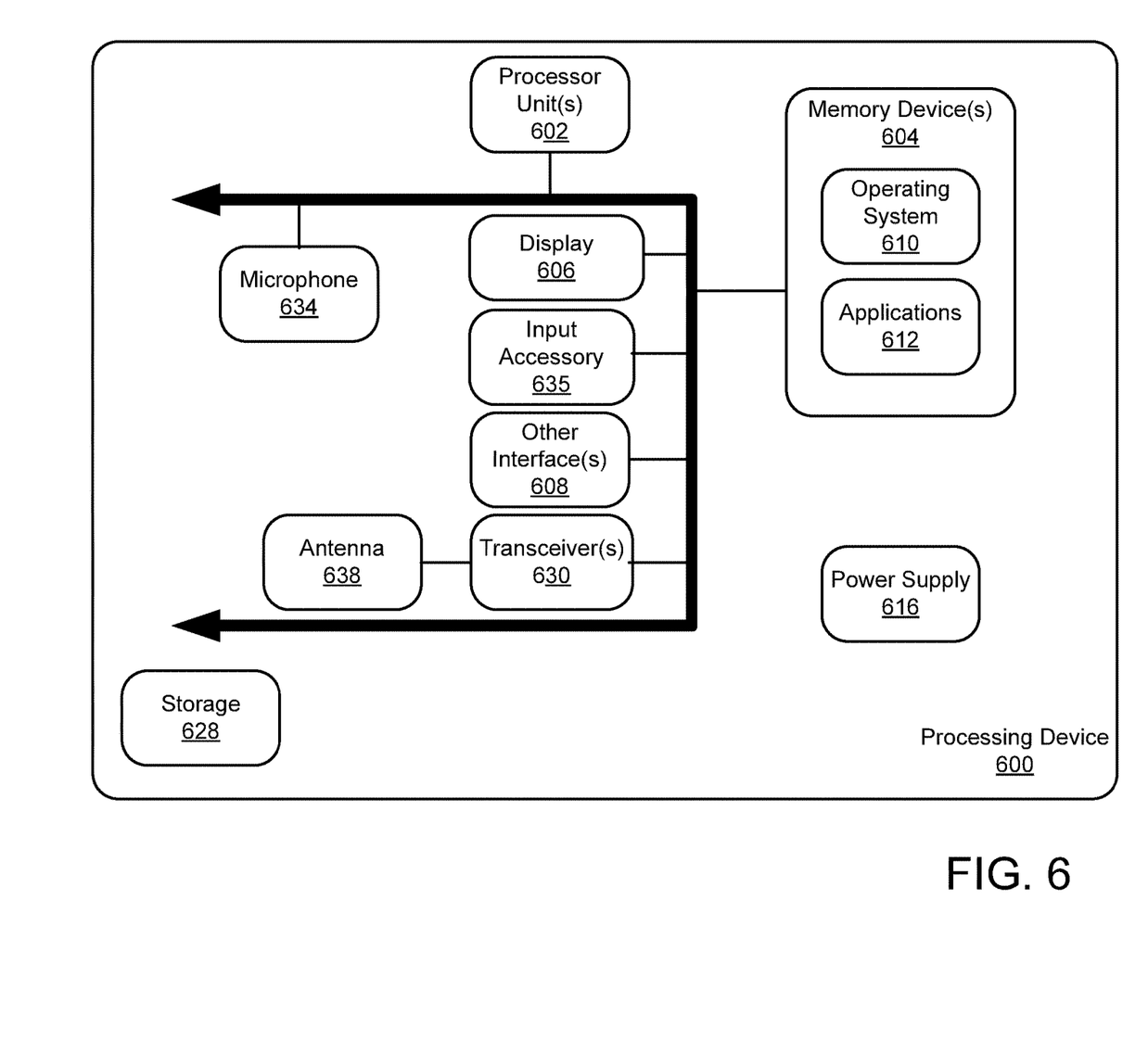
FIG. 6 illustrates an example schematic of a processing device suitable for implementing aspects of the disclosed technology.

FIG. 6 illustrates an example schematic of a processing device 600 suitable for implementing aspects of the disclosed technology. The processing device 600 may be configured to perform functionality described herein with respect to either a lighting accessory (e.g., 102 in FIG. 1) or a host device (e.g., 112 in FIG. 1) that is coupled to a lighting accessory. The processing device 600 includes one or more processor unit(s) 602, memory 604, a display 606, and other interfaces 608 (e.g., buttons). The memory 604 generally includes both volatile memory (e.g., RAM) and non-volatile memory (e.g., flash memory). An operating system 610, such as the Microsoft Windows® operating system or other operating system, resides in the memory 604 and is executed by the processor unit(s) 602, although it should be understood that other operating systems may be employed.

One or more applications 612, such as the application 114 of FIG. 1 are loaded in the memory 604 and executed on the operating system 610 by the processor unit(s) 602. Applications 612 may receive input from various input devices such as a microphone 634, input accessory 635 (e.g., keypad, mouse, stylus, touchpad, gamepad, racing wheel, joystick), or inputs from various environmental sensors 636 such as one or more cameras, microphones, etc. The processing device 600 includes projection optics 632 for projecting virtual objects when operating in a virtual or mixed reality mode. The processing device 600 further includes a power supply 616, which is powered by one or more batteries or other power sources and which provides power to other components of the processing device 600. The power supply 616 may also be connected to an external power source (not shown) that overrides or recharges the built-in batteries or other power sources.

The processing device 600 includes one or more communication transceivers 630 and an antenna 638 to provide network connectivity (e.g., a mobile phone network, Wi-Fi®, Bluetooth®). The processing device 600 may also include various other components, such as a positioning system (e.g., a global positioning satellite transceiver), one or more accelerometers, one or more cameras, an audio interface (e.g., the microphone 634, an audio amplifier and speaker and/or audio jack), and storage devices 628. Other configurations may also be employed.

The processing device 600 may include a variety of tangible computer-readable storage media and intangible computer-readable communication signals. Tangible computer-readable storage can be embodied by any available media that can be accessed by the processing device 600 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 600. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

An example method disclosed herein includes determining a posture of a lighting accessory coupled to a host device, and selectively configuring a setting of an application executing on the host device based at least in part on the determined posture. The posture is one of multiple user-selectable physical configurations.

According to an example method of any preceding method, the lighting accessory includes a camera and selectively configuring the setting of the application further comprises selectively configuring one or more video capture settings.

In still another example method of any preceding method, determining the posture of the lighting accessory further comprises receiving, at the host device, accessory posture information based at least in part on a sensor measurement.

In yet still another example method of any preceding method, selectively configuring the setting of the application further comprises: selecting one or more light control settings for the lighting accessory and transmitting a control signal to configure light output of the lighting accessory according to the selected one or more light control settings. The light control settings include at least one of a brightness setting and a hue setting.

In still another example method of any preceding method, selectively configuring the one or more video capture settings comprises changing a privacy mode setting of the application that controls broadcast of a video captured by the camera between the host device and a network.

In still yet another example method of any preceding method, changing the privacy mode setting further comprises configuring the application to prevent transmission of video captured by the camera across the network when the determined posture indicates the lighting accessory is oriented to direct light output in a direction substantially perpendicular to a surface supporting the lighting accessory.

In still yet another example method of any preceding method, changing the privacy setting further comprises configuring the application to transmit video captured by the camera across the network when the detected posture indicates the lighting accessory is oriented to direct light output in a direction substantially parallel to the surface supporting the lighting accessory.

An example system disclosed herein includes a host device coupled to a lighting accessory. The host device is configured to receive an input indicative of a posture of the lighting accessory, where the posture is of multiple user-selectable physical configurations. The host device is further configured to selectively configure a setting of an application based at least in part on the posture of the lighting accessory.

In yet still another example system of any preceding system, the lighting accessory includes a camera and the host device selectively configures one or more video capture settings based at least in part on the posture of the lighting accessory.

In still another example system of any preceding system, the input received at the host device is based at least in part on a sensor measurement.

In yet still another example system of any preceding system, the host device selectively configures the setting of the application by selecting one or more light control settings for the lighting accessory, and by transmitting a control signal to configure light output of the lighting accessory according to the selected one or more light control settings. The light control settings include at least one of a brightness setting and a hue setting, In still another example system of any preceding system, the host device changes a privacy mode setting of the application. The privacy mode setting controls broadcast of a video stream captured by the camera between the host device and a network.

In yet still another example system of any preceding system, the host device changes the privacy mode setting by configuring the application to prevent transmission of video captured by the camera across the network when the determined posture indicates the lighting accessory is oriented to direct light output in a direction substantially perpendicular to a surface supporting the lighting accessory.

In still another example system of any preceding system, the host device changes the privacy mode setting by configuring the application to transmit video captured by the camera across the network when the detected posture indicates the lighting accessory is oriented to direct light output in a direction substantially parallel to surface supporting the lighting accessory.

In an example tangible computer-readable storage media disclosed herein, an encoded computer process comprises determining a posture of a lighting accessory coupled to a host device and selectively configuring a setting of an application executing on the host device based at least in part on the determined posture. The posture is one of multiple user-selectable physical configurations.

In another example tangible computer-readable storage media of any preceding computer-readable storage media, the lighting accessory communicated with via the computer process includes a camera. Selectively configuring the setting of the application further comprises selectively configuring one or more video capture settings.

In an example computer process encoded by any preceding computer-readable storage media, determining the posture of the lighting accessory further comprises receiving, at the host device, accessory posture information based at least in part on a sensor measurement.

In an example computer process encoded by any preceding computer-readable storage media, selectively configuring the setting of the application further comprises selecting one or more light control settings for the lighting accessory and transmitting a control signal to configure light output of the lighting accessory according to the selected one or more light control settings. The light control settings include at least one of a brightness setting and a hue setting.

In an example computer process encoded by any preceding computer-readable storage media, selectively configuring the one or more video capture settings comprises changing a privacy mode setting of the application. The privacy mode setting controls broadcast of a video captured by the camera between the host device and a network.

In another example tangible computer-readable storage media of any preceding computer-readable storage media, the computer process further comprises configuring the application to prevent transmission of video captured by the camera across the network when the determined posture indicates the lighting accessory is oriented to direct light output in a direction substantially perpendicular to a surface supporting the lighting accessory, and configuring the application to transmit video captured by the camera across the network when the detected posture indicates the lighting accessory is oriented to direct light output in a direction substantially parallel to the surface supporting the lighting accessory.

An example system disclosed herein includes a means for determining a posture of a lighting accessory coupled to a host device and a means for selectively configuring a setting of an application executing on the host device based at least in part on the determined posture. The posture is one of multiple user-selectable physical configurations.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendix, provide a complete description of the structure and use of exemplary implementations.

What is claimed is:

1. A method comprising:
   determining a posture of a lighting accessory coupled to a host device, the posture being one of multiple user-selectable physical configurations; and
   selectively configuring a video capture setting of a video broadcasting application executing on the host device based at least in part on the determined posture.

2. The method of claim 1, wherein determining the posture of the lighting accessory further comprises:
   receiving, at the host device, accessory posture information based at least in part on a sensor measurement.

3. The method of claim 1, wherein the method further comprises:
   selecting one or more light control settings for the lighting accessory based at least in part on the determined posture, the light control settings including at least one of a brightness setting and a hue setting; and
   transmitting a control signal to configure light output of the lighting accessory according to the selected one or more light control settings.

4. The method of claim 1, wherein selectively configuring the video capture setting comprises:
   changing a privacy mode setting of the application, the privacy mode setting controlling broadcast of a video captured by a camera between the host device and a network.

5. The method of claim 4, wherein changing the privacy mode setting further comprises:
   configuring the video broadcasting application to prevent transmission of video captured by the camera across the network when the determined posture indicates the lighting accessory is oriented to direct light output in a direction substantially perpendicular to a surface supporting the lighting accessory.

6. The method of claim 5, wherein changing the privacy setting further comprises:
   configuring the video broadcasting application to transmit video captured by the camera across the network when the determined posture indicates the lighting accessory is oriented to direct light output in a direction substantially parallel to the surface supporting the lighting accessory.

7. A system comprising:
   a host device coupled to a lighting accessory, the host device being configured to:
      receive an input indicative of a posture of the lighting accessory, the posture being one of multiple user-selectable physical configurations; and
      selectively configure a video capture setting of a video broadcasting application based at least in part on the posture of the lighting accessory.

8. The system of claim 7, wherein the lighting accessory includes a camera.

9. The system of claim 8, wherein the host device changes a privacy mode setting of the video capture application, the privacy mode setting controlling broadcast of a video stream captured by the camera between the host device and a network.

10. The system of claim 9, wherein the host device changes the privacy mode setting by configuring the video capture application to prevent transmission of video captured by the camera across the network when the posture indicates the lighting accessory is oriented to direct light output in a direction substantially perpendicular to a surface supporting the lighting accessory.

11. The system of claim 9, wherein the host device changes the privacy mode setting by configuring the video capture application to transmit video captured by the camera across the network when the detected posture indicates the lighting accessory is oriented to direct light output in a direction substantially parallel to surface supporting the lighting accessory.

12. The system of claim 7, wherein the input received at the host device is based at least in part on a sensor measurement.

13. The system of claim 7, wherein the host device selectively configures the setting of the video broadcasting application by:
   selecting one or more light control settings for the lighting accessory, the light control settings including at least one of a brightness setting and a hue setting; and
   transmitting a control signal to configure light output of the lighting accessory according to the selected one or more light control settings.

14. One or more tangible computer-readable storage media implementing computer-executable instructions for executing a computer process, the computer process comprising:
   determining a posture of a lighting accessory coupled to a host device, the posture being one of multiple user-selectable physical configurations; and
   selectively configuring a video capture setting of a video broadcasting application executing on the host device based at least in part on the determined posture.

15. The one or more tangible computer-readable storage media of claim 14, wherein the lighting accessory includes a camera.

16. The one or more tangible computer-readable storage media of claim 14, wherein determining the posture of the lighting accessory further comprises:
   receiving, at the host device, accessory posture information based at least in part on a sensor measurement.

17. The one or more tangible computer-readable storage media of claim 14, wherein selectively configuring the video capture setting of the video broadcasting application further comprises:
   selecting one or more light control settings for the lighting accessory, the light control settings including at least one of a brightness setting and a hue setting; and
   transmitting a control signal to configure light output of the lighting accessory according to the selected one or more light control settings.

18. The one or more tangible computer-readable storage media of claim 4, wherein selectively configuring the video capture setting comprises:
   changing a privacy mode setting of the video broadcasting application, the privacy mode setting controlling broadcast of a video captured by the camera between the host device and a network.

19. The one or more tangible computer-readable storage media of claim 18, wherein changing the privacy mode setting further comprises:
   configuring the video broadcasting application to prevent transmission of video captured by the camera across the network when the determined posture indicates the lighting accessory is oriented to direct light output in a direction substantially perpendicular to a surface supporting the lighting accessory; and configuring the video broadcasting application to transmit video captured by the camera across the network when the detected posture indicates the lighting accessory is oriented to direct light output in a direction substantially parallel to the surface supporting the lighting accessory.

\* \* \* \* \*